US012799570B2

(12) United States Patent
Watanabe et al.

(10) Patent No.: US 12,799,570 B2
(45) Date of Patent: Nov. 17, 2026

(54) GRAIN-ORIENTED ELECTRICAL STEEL SHEET AND METHOD OF PRODUCING SAME

(71) Applicant: JFE STEEL CORPORATION, Tokyo (JP)

(72) Inventors: Makoto Watanabe, Tokyo (JP); Takuya Yamada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 550 days.

(21) Appl. No.: 18/546,780

(22) PCT Filed: Mar. 15, 2022

(86) PCT No.: PCT/JP2022/011728

§ 371 (c)(1),
(2) Date: Aug. 17, 2023

(87) PCT Pub. No.: WO2022/196704

PCT Pub. Date: Sep. 22, 2022

(65) Prior Publication Data

US 2024/0254600 A1 Aug. 1, 2024

(30) Foreign Application Priority Data

Mar. 15, 2021 (JP) ................................ 2021-041861

(51) Int. Cl.

| | |
|---|---|
| ***C21D 8/12*16** | (2026.01) |
| ***C21D 1/76*** | (2006.01) |
| ***C21D 3/04*** | (2006.01) |
| ***C21D 6/00*** | (2006.01) |
| ***C21D 8/1244*** | (2026.01) |
| ***C21D 8/1277*** | (2026.01) |
| ***C21D 9/46*** | (2006.01) |
| ***C22C 38/02*** | (2006.01) |
| ***C22C 38/04*** | (2006.01) |
| ***C23C 22/74*** | (2006.01) |
| ***H01F 1/147*** | (2006.01) |
| ***H01F 1/18*** | (2006.01) |

(52) U.S. Cl.

CPC ................ *C22C 38/02* (2013.01); *C21D 1/76* (2013.01); *C21D 3/04* (2013.01); *C21D 6/008* (2013.01); *C21D 8/1222* (2013.01); *C21D 8/1233* (2013.01); *C21D 8/1255* (2013.01); *C21D 8/1266* (2013.01); *C21D 8/1272* (2013.01); *C21D 8/1283* (2013.01); *C21D 9/46* (2013.01); *C22C 38/04* (2013.01); *C23C 22/74* (2013.01); *H01F 1/147* (2013.01); *H01F 1/18* (2013.01); *C21D 2201/05* (2013.01)

(58) Field of Classification Search

CPC ..................................................... C22C 38/04
See application file for complete search history.

(56) References Cited

U.S. PATENT DOCUMENTS

| | | | |
|---|---|---|---|
| 2009/0047537 | A1 | 2/2009 | Nanba et al. |
| 2013/0129984 | A1 | 5/2013 | Omura et al. |
| 2013/0228251 | A1 | 9/2013 | Shingaki et al. |
| 2016/0230240 | A1 | 8/2016 | Senda et al. |
| 2019/0017139 | A1 | 1/2019 | Omura et al. |

FOREIGN PATENT DOCUMENTS

| | | | | |
|---|---|---|---|---|
| CN | 101180411 | A | | 5/2008 |
| CN | 103069032 | A | | 4/2013 |
| CN | 110643796 | A | | 1/2020 |
| JP | H05117752 | A | | 5/1993 |
| JP | H06287764 | A | | 10/1994 |
| JP | H0941042 | A | | 2/1997 |
| JP | 3397277 | B2 | | 4/2003 |
| JP | 2005069917 | A | | 3/2005 |
| JP | 2012031515 | A | * | 2/2012 |
| JP | 2012052232 | A | | 3/2012 |
| JP | 2012092409 | A | | 5/2012 |
| JP | 2014201806 | A | | 10/2014 |
| JP | 5923881 | B2 | | 5/2016 |
| JP | 2016216779 | A | | 12/2016 |
| JP | WO2015040799 | A1 | | 3/2017 |
| JP | 2017133080 | A | | 8/2017 |
| JP | 6465054 | B2 | | 2/2019 |

OTHER PUBLICATIONS

English machine translation of JP 2012-031515 A of Watanabe (Year: 2012).*

Jul. 4, 2024, the Extended European Search Report issued by the European Patent Office in the corresponding European Patent Application No. 22771449.0.

Sep. 22, 2025, Office Action issued by the Korean Intellectual Property Office in the corresponding Korean Patent Application No. 10-2023-7028073 with English language concise statement of relevance.

Apr. 10, 2025, Office Action issued by the China National Intellectual Property Administration in the corresponding Chinese Patent Application No. 202280020922.1 with English language search report.

Aug. 8, 2023, Notification of Reasons for Refusal issued by the Japan Patent Office in the corresponding Japanese Patent Application No. 2022-542097 with English language Concise Statement of Relevance.

May 31, 2022, International Search Report issued in the International Patent Application No. PCT/JP2022/011728.

* cited by examiner

*Primary Examiner* — Jophy S. Koshy

(74) *Attorney, Agent, or Firm* — KENJA IP LAW PC

(57) ABSTRACT

Proposed is a way to improve film adhesion when magnetic domain refining treatment is performed. The Mn+Fe concentration in the ceramic base film of a grain-oriented electrical steel sheet is 0.05 mass % or more, and the Young's modulus of the base film is 108 GPa to 144 GPa.

2 Claims, No Drawings

GRAIN-ORIENTED ELECTRICAL STEEL SHEET AND METHOD OF PRODUCING SAME

TECHNICAL FIELD

The present disclosure relates to grain-oriented electrical steel sheets, in particular grain-oriented electrical steel sheets to be subjected to magnetic domain refining treatment, and a method of producing the same, and specifically to grain-oriented electrical steel sheets with excellent magnetic properties and film properties and a method of producing the same.

BACKGROUND

Since grain-oriented electrical steel sheets are mainly used as iron core materials for transformers, grain-oriented electrical steel sheets with excellent magnetic properties, especially low iron loss, are highly sought after. Grain-oriented electrical steel sheets are conventionally produced by a method comprising subjecting cold-rolled Si-containing steel sheets, which have undergone decarburization annealing combined with primary recrystallization annealing and have been coated with an annealing separator which is composed mainly of MgO, to secondary recrystallization in final annealing to highly align the crystal grains in the {110}<001> orientation (the so-called "Goss orientation").

The final annealing, together with an annealing for secondary recrystallization and a purification treatment which heats to a maximum of about 1200 °C, requires a period of about 10 days. Therefore, this is usually performed by batch annealing, in which annealing is performed while the material is wound in a coiled state.

During the final annealing, a forsterite film is formed on the steel sheet surface by the reaction of $MgO+SiO_2 \rightarrow Mg_2SiO_4$ between subscale, which is composed mainly of $SiO_2$ and is formed on the steel sheet surface during the decarburization annealing, and the annealing separator which is composed mainly of MgO and is applied to the steel sheet surface after the decarburization annealing.

In addition to providing insulation properties and corrosion resistance to steel sheets, such a forsterite film also improves magnetic properties by imparting tensile stress to the steel sheet surface. Therefore, the forsterite film should be uniform and have excellent adhesion.

In recent years, there has been a growing demand for further improvement of iron loss characteristics in grain-oriented electrical steel sheets against a backdrop of requirements for energy conservation. For this purpose, grain-oriented electrical steel sheets that have completed flattening annealing are heated by irradiating them with a laser, electron beam, or plasma to add local strain, thereby improving iron loss properties.

However, such local heating may cause the film to partially separate due to thermal strain. The presence of such film separation areas causes corrosion resistance and insulation properties to degrade. Therefore, the coating must be applied and baked again to prevent this.

This extra process leads to problems such as higher costs and insufficient reduction of iron loss due to the release of applied local thermal strain.

Various measures have been proposed to solve such problems. For example, JP 2012-52232 A (PTL 1) describes a method of irradiating an electron beam onto enriched areas of Se at the interface between a film and a steel substrate, with the ratio of the enriched areas controlled at a predetermined level.

JP 6465054 B (PTL 2) describes a method of applying magnetic domain refinement treatment to the surface of a grain-oriented electrical steel sheet, which has undergone final annealing, by irradiating the surface with an electron beam after heating the grain-oriented electrical steel sheet to 50 °C or more.

JP 2015-40799 A1 (PTL 3) describes that Ti and Al intensities of a steel sheet surface when quantitatively analyzed by X-ray fluorescence analysis should be in a specific relationship with FX(Al) and Fe intensities, and that final annealing should be within a specific heat pattern to achieve this.

JP 2012-92409 A (PTL 4) describes that a base film contains nitrogen compounds equivalent to 0.02 $g/m^2$ or more of N, and furthermore, the degree of contact between the base film and a steel sheet is kept within a specific range.

CITATION LIST

Patent Literature

PTL 1: JP 2012-52232 A
PTL 2: JP 6465054 B
PTL 3: JP 2015-40799 A1 (publication in Japan of WO2015/040799)
PTL 4: JP 2012-92409 A

SUMMARY

Technical Problem

Among these conventional techniques, first PTL 1 is based on a finding wherein improving the film causes Se enrichment, which in turn causes the film to be easily destroyed during magnetic domain refining, but this is not the case with an electron beam. This method is unusable for magnetic domain refining by methods other than an electron beam, such as a laser or plasma jet.

Furthermore, in addition to Se enrichment, S, Al, and other enrichments should also be considered, and keeping them all within a given range was difficult because each element has a different enrichment state.

In addition to Se enrichment, S and Al enrichment is also mentioned in PTL 1. However, no matter which of these is adopted, keeping all areas of a coil within a given range is difficult. The temperature and atmosphere are unable to be made uniform over the entire length and width of the coil due to final annealing in the coiled state. Therefore, keeping the enrichments within the limited range described in PTL 1 was difficult.

In addition, even in the case of using an electron beam, the problem of film separation in such technology still remains when the irradiation energy for magnetic domain refining is increased to improve the iron loss reducing effect.

Similarly, the method described in PTL 2 is limited to magnetic domain refining by an electron beam, and no effect has been recognized in magnetic domain refining by plasma jet or laser. In addition, heating and cooling are performed in the vacuum section before and after electron beam irradiation, resulting in large equipment and running costs. Furthermore, the same problems as those described in PTL 1 remain when an electron beam is used.

In PTL 3, taking an unnatural heat cycle of rapid heating from 400 °C to 650 °C in final annealing followed by slow heating from 700 °C to 850 °C is necessary. Therefore, annealing material wound in a coiled state is excessively costly in terms of exhaust heat from an annealing furnace. Satisfying this condition over the entire length and width of a coil is also difficult, and a problem remains in terms of uniformly forming a film under good conditions.

In PTL 4, in addition to adjusting the length of an interface between a base film and a steel substrate, specifying the amount of gas supplied in the final annealing to form nitrides, the coil winding tension, and the amount of moisture in the annealing separator is also necessary. However, obtaining a uniform film over the entire surface of the coil was difficult because some areas are prone to moisture retention depending on the coil position, and some areas are prone to winding tension while others are not.

As described above, the method of preventing film separation due to magnetic domain refining treatment is still far from sufficient. Furthermore, with the growing need for energy conservation in recent years, the irradiation energy of magnetic domain refining treatment tends to be increased to further improve iron loss properties, and even measures that were recognized in the past as effective in preventing film separation have become insufficiently effective in recent years.

In view of the above circumstances, it would be helpful to propose a grain-oriented electrical steel sheet and a method of producing the same, in which film adhesion is secured when magnetic domain refining treatment is performed by adjusting a composition of a base film and improving physical properties thereof.

Solution to Problem

The primary features according to the present disclosure are as follows:

1. A grain-oriented electrical steel sheet having a ceramic film and containing Mn, wherein the film has a Mn+Fe concentration of 0.05 mass % or more and a Young's modulus of 108 GPa to 144 GPa.
2. A method of producing the grain-oriented electrical steel sheet according to aspect 1, comprising:

subjecting a Mn-containing steel material for grain-oriented electrical steel sheets to hot rolling to obtain a steel sheet; then subjecting the steel sheet to cold rolling once or twice or more with intermediate annealing performed therebetween to a final sheet thickness; and then subjecting the steel sheet to decarburization annealing combined with primary recrystallization; then applying an annealing separator containing 50 mass % or more of MgO to a surface of the steel sheet; then subjecting the steel sheet to final annealing; and optionally removing an unreacted separator after the final annealing and then subjecting the steel sheet to flattening annealing, wherein as conditions of the decarburization annealing, an annealing temperature is controlled within a range of 700 °C to 900 °C, a soaking time is controlled within a range of 30 seconds to 300 seconds, and, at least in an earlier stage of the soaking process, a humid hydrogen atmosphere dew point is controlled within a range of 45 °C to 60 °C, such that $\{(A1+A2)/(A1+A2+A3)\}\times 100$ is 45% or more, where A1, A2, and A3 represent absorbance of fayalite, absorbance of clinoferrosilite, and absorbance of silica, respectively, as measured using Fourier transform infrared absorption spectroscopy (FTIR) on the surface of the steel sheet after the decarburization annealing, and wherein the final annealing takes place in an atmosphere containing $H_2$, at least in a temperature range of 950 °C to 1100 °C, and a gas flow rate in the temperature range is set in a range of $1.0\times 10^{-5}$ (NL/min) to $7.6\times 10^{-5}$ (NL/min) per 1 $m^2$ of steel sheet surface area.

Advantageous Effect

This disclosure provides a grain-oriented electrical steel sheet with excellent film adhesion. In particular, preventing film separation during magnetic domain refining treatment enables corrosion resistance and insulation properties of a film to be maintained and enables the magnetic domain refining treatment to be performed at a higher energy density, effectively reducing iron loss.

DETAILED DESCRIPTION

The following is a description of the experiments that led to the development our sheet and method.

<Experiment 1>

Steel containing C: 0.06 mass %, Si: 3.3 mass %, Mn: 0.07 mass %, Al: 0.03 mass %, and N: 0.01 mass % is prepared by smelting and made into a steel slab by continuous casting, then heated to 1400 °C, subjected to hot rolling and made into a hot-rolled sheet with a sheet thickness of 2.2 mm. The hot-rolled sheet was subjected to hot-rolled sheet annealing under a set of conditions including 1000 °C for 60 seconds, primary cold rolling to an intermediate thickness of 1.7 mm, intermediate annealing under a set of conditions including 1100 °C for 80 seconds, and made into a cold-rolled sheet with a final sheet thickness of 0.23 mm by warm rolling at 200 °C.

The cold-rolled sheet was then subjected to decarburization annealing in which the cold-rolled sheet was held at 830 °C for 100 seconds in an atmosphere of 50 vol % $H_2$-50 vol % $N_2$ with various changes in dew point, which changed the oxides formed on the steel sheet surface. Then, an annealing separator composed mainly of magnesium oxide was applied to the steel sheet surface and dried.

As final annealing, the steel sheet was then subjected to heat treatment under a set of conditions including heating in a $N_2$ atmosphere up to 700 °C and in an atmosphere of 75 vol % $H_2$+25 vol % $N_2$ from 700 °C to 1200 °C at a rate of 25 °C/h, followed by the final annealing combined with purification, in which the steel sheet was maintained in a $H_2$ atmosphere for 10 hours at 1200 °C. The final annealing was performed by varying the gas flow rate during the heating process.

For the various final annealed sheets with a forsterite film thus obtained (a ceramic film, hereafter simply referring to a base film means a forsterite film), the Young's modulus of a base film was evaluated by nanoindentation, and the Mn+Fe concentration in the base film was quantified by Auger electron spectroscopy.

The nanoindentation method is a method in which an indenter is pressed into an object to be measured, the load and depth of the indenter at that time are continuously measured, and the composite modulus is calculated from the relationship between the indentation depth and the load. This nanoindentation method is generally used to test the physical properties of thin films because of the smaller indentation depth of the indenter compared to the micro-Vickers method.

The measurement conditions are a linear load application at room temperature using a diamond triangular pyramid indenter (Berkovich type, 60 ° apical angle) in which the indenter was pressed against a base film at three arbitrary points with a loading time of 5 seconds, an unloading time of 2 seconds, and a maximum load of 1000 μN.

Auger electron spectroscopy measures the kinetic energy distribution of Auger electrons emitted when the base film is irradiated with electron beams. The escape depth of Auger electrons is limited to a few nm or less. Therefore, the concentration of various components only in the base film area can be analyzed without being affected by the steel substrate.

A coating agent was then applied to the final annealing coil, which is the steel sheet after the aforementioned purification annealing, and the coil was dried and subjected to a flattening treatment under a set of conditions including 800 °C for 20 seconds to form a product sheet. The product sheet was subjected to magnetic domain refining treatment by performing laser irradiation at an irradiation power of 3.0 mJ/mm$^2$, and the presence or absence of separation of the film on the product sheet after irradiation was examined by microscopic observation.

The laser irradiation was performed in a direction perpendicular to the rolling direction at an irradiation pitch of 10 mm.

The results of these observations are listed in Table 1.

TABLE 1

| Sum of absorbance ratios (%) | Gas flow rate ($\times 10^{-5}$ NL/min) | Young's modulus (GPa) | Mn + Fe concentration (mass %) | Film separation |
|---|---|---|---|---|
| 15 | 2.0 | 155 | 0.01 | Present |
| 20 | 2.0 | 154 | 0.03 | Present |
| 30 | 2.0 | 151 | 0.04 | Present |
| 40 | 2.0 | 145 | 0.04 | Present |
| 45 | 2.0 | 140 | 0.05 | Absent |
| 50 | 2.0 | 130 | 0.07 | Absent |
| 60 | 2.0 | 120 | 0.07 | Absent |
| 70 | 2.0 | 118 | 0.08 | Absent |
| 50 | 0.4 | 98 | 0.08 | Present |
| 50 | 1.0 | 108 | 0.08 | Absent |
| 50 | 4.0 | 138 | 0.06 | Absent |
| 50 | 6.0 | 142 | 0.06 | Absent |
| 50 | 7.6 | 144 | 0.05 | Absent |
| 50 | 8.0 | 144 | 0.04 | Present |
| 50 | 9.0 | 147 | 0.04 | Present |
| 50 | 10.0 | 149 | 0.03 | Present |
| 50 | 12.0 | 152 | 0.02 | Present |

Table 1 illustrates that no film separation was observed in the region where the Young's modulus of the base film is in the range of 108 GPa to 144 GPa and where the Mn+Fe concentration in the base film is 0.05 mass % or more, indicating that a good film was obtained.

The present inventors believe that the reasons for these results are as follows.

First, the reasons why the separation resistance of the film is improved when the Young's modulus of the base film is in the above-described range are as follows.

The film separating when thermal strain is applied due to magnetic domain refining is because local thermal expansion is caused by heating for a very short time, generating shear stress from the difference in thermal expansion coefficient between the steel sheet and the film when such a thermally expanded area is cooled which then exceeds the fracture resistance stress of the film.

Therefore, increasing the fracture resistance of the film due to thermal stress is considered to be effective in preventing such separation. Further, reducing the Young's modulus of the film is effective in increasing this fracture resistance. This is because shear stress due to thermal expansion increases as Young's modulus increases. On one hand, a lower Young's modulus of the film is not necessarily good, and a Young's modulus at less than 108 GPa is undesirable because the tensile tension exerted by the film on the steel sheet decreases and iron loss increases.

On the other hand, the reasons why the separation resistance of the film is improved when Fe and Mn are introduced into the film are as follows.

Fe and Mn are thought to exist in the film in a metallic state or as other compounds (sulfides, oxides, silicates, etc.), but since these compounds have a relatively larger thermal expansion coefficient than forsterite, the main component of the base film, and are similar to iron, thermal expansion due to heating is less likely to occur, preventing film separation. Fe and Mn themselves also work to reduce the Young's modulus of the film.

The present inventors then investigated the factors that control the Young's modulus and Fe+Mn concentration of the base film. Here, the present inventors focused on the absorbance of fayalite, clinoferrosilite, and silica for the following reason. They all react with the MgO in the annealing separator to form forsterite, the base film.

The ratios of the sum of the absorbance, A1, of fayalite, and the absorbance, A2, of clinoferrosilite to the total sum of the absorbances, A1, A2, and A3 of fayalite, clinoferrosilite, and silica, respectively (hereinafter referred to as the sum of the absorbance ratios) are listed in Table 1 above. The absorbances of fayalite, clinoferrosilite and silica on the steel sheet surface, as measured by FTIR, are A1, A2 and A3, respectively. The FTIR measurement method and absorbance measurement method are described in JP 2005-69917 A.

In the present disclosure, the sum of the absorbance ratios is the value obtained by the following equation (Formula 1).

In detail, the absorbance ratio of fayalite=[A1/(A1+A2+A3)]×100 and the absorbance ratio of clinoferrosilite=[A2/(A1+A2+A3)]×100. The sum of the absorbance ratio of fayalite and the absorbance ratio of clinoferrosilite is then: Sum of the Absorbance Ratios:

$$= [A1/(A1+A2+A3)]\times 100 + [A2/(A1+A2+A3)]\times 100 = \{(A1+A2)/(A1+A2+A3)\}\times 100 \quad \text{Formula 1}$$

Table 1 also lists the gas flow rate per coil surface area of the atmosphere gas supplied into the final annealing furnace in the temperature range of 950 °C to 1100 °C during the final annealing.

As illustrated in Table 1, the higher the sum of the absorbance ratios of fayalite and clinoferrosilite, the higher the Fe+Mn concentration in the base film tends to be, but in addition, adjusting the gas flow rate tends to further increase the Fe+Mn concentration.

Furthermore, the Young's modulus of the base film is also greatly affected by the sum of the absorbance ratios of fayalite and clinoferrosilite and the gas flow rate, and because these are each 45% or more and $1.0\times10^{-5}$ NL/min to $7.6\times10^{-5}$ NL/min per steel sheet surface area, respectively, the Fe+Mn concentration in the base film increases and Young's modulus is kept in the range of 108 GPa to 144 GPa.

Here, the present inventors believe the following is the reasons for the above results.

Fayalite and clinoferrosilite are represented by $Fe_2SiO_4$ and $FeSiO_3$, but in fact, in Mn-containing steel sheets, Fe and Mn may be mutually substituted, forming $(Fe_x,Mn_{1-x})_2SiO_4$ and $(Fe_x,Mn_{1-x})SiO_3$. During the final annealing, these elements are in solid solution with each other and with Mg, $(Fe_x,Mn_{1-x})_2SiO_4+MgO \rightarrow (Fe_y,Mn_z,Mg_{1-y-z})_2SiO_4+(Fe_{x-y},Mn_{1-x-z},Mg_{y+z})O$ $(Fe_x,Mn_{1-x})SiO_3+MgO \rightarrow (Fe_y,Mn_z,Mg_{1-y-z})SiO_3+(Fe_{x-y},Mn_{1-x-z},Mg_{y+z})O$ Mg enters the compound, and Fe and Mn are released outside the oxide which eventually remain as Fe and Mn compounds in the base film. In other words, it is thought that the amount of Fe+Mn in the base film can be secured by securing a certain amount or more of fayalite or clinoferrosilite.

In addition, with regard to the atmospheric gas conditions during the final annealing, the behavior in the temperature range of 950 °C to 1100 °C in the final annealing temperature range is extremely important for film formation. This is because forsterite formation reactions begin in earnest in this temperature range. Further, introducing $H_2$ into the atmosphere in such a temperature range is important. This facilitates the formation of the film by promoting the diffusion of MgO and the migration of silica in an internal oxidation film to a steel sheet surface layer. The $H_2$ concentration introduced above is not particularly limited, but about 5 vol % or more is preferred. The upper limit may be 100 vol %.

In a case where the gas flow rate is high, the diffusion of MgO by $H_2$ in the atmosphere works more strongly. This means that the substitution reaction between Mg, and Mn or Fe as described above is also promoted. As a result, the Mn and Fe trapped in the film diffuse into MgO. That is, the amount of Fe and Mn in the film will decrease. On the other hand, moderately decreasing gas flow rate enables the diffusion of Mn and Fe into MgO to be suppressed while promoting surface layer migration of silica during internal oxidation by $H_2$, effectively leaving Mn and Fe in the film.

A high gas flow rate also excessively increases the forsterite formation capacity. As a result, the resulting forsterite film has a coarsened grain size and decreased porosity, which increases Young's modulus. In this regard, decreasing the gas flow rate to a moderate level is necessary. On the other hand, excessively decreasing the gas flow rate causes the effect of introducing the gas itself to decrease. As a result, film formation becomes poor and the morphology of the film degrades to the point that the film separates without magnetic domain refining.

In the present invention, it is important to control the gas flow rate per steel sheet surface area. Usually, the final annealing of a grain-oriented electrical steel sheets is performed by a batch-type annealing furnace in the form of a coil. Here, the gas flow rate is set such that the gas replacement frequency is appropriate for the internal volume of the annealing furnace bell. For example, in a case where the furnace volume is 10 $m^3$, the gas flow rate is usually 1.5 NL/min to 6 NL/min. However, in the present disclosure, the optimum flow rate changes depending on the amount of oxides on the steel sheet surface and the amount of applied MgO. Therefore, setting the gas flow rate to be about 10% to 60% lower than that calculated from the furnace volume, as described below, is necessary.

Next, the preferred chemical composition of the steel material (slabs) of the grain-oriented electrical steel sheet which apply the sheet and method according to the present disclosure is described. The balance of the chemical composition listed below is Fe and inevitable impurities.

C: 0.020 Mass % to 0.080 Mass %

In a case where the C content is less than 0.020 mass %, grain boundary strengthening effects due to C may be lost, resulting in cracks in the slab and other defects that may interfere with manufacturing. On the other hand, in a case where the content exceeds 0.080 mass %, reducing the content to 0.005 mass % or less by decarburization annealing, where no magnetic aging occurs, may be difficult. Therefore, C is preferably 0.020 mass % or more. C is more preferably 0.025 mass % or more. C is preferably 0.080 mass % or less. C is more preferably 0.075 mass % or less.

Si: 2.50 Mass % to 4.50 Mass %

Si is an element necessary to increase the specific resistance of the steel and reduce iron loss. This effect may be insufficient at less than 2.50 mass %. On the other hand, in a case where the content exceeds 4.50 mass %, the workability may decrease, making production by rolling difficult. Therefore, Si is preferably 2.50 mass % or more. Si is more preferably 2.80 mass % or more. Si is preferably 4.50 mass % or less. Si is more preferably 4.00 mass % or less.

Mn: 0.03 Mass % to 0.30 Mass %

Mn is an element necessary to improve the hot workability of steel. This effect may be insufficiently realized at less than 0.03 mass %. On the other hand, in a case where the content exceeds 0.30 mass %, the magnetic flux density of the product sheet may decrease. Therefore, Mn is preferably 0.03 mass % or more. Mn is more preferably 0.04 mass % or more. Mn is preferably 0.30 mass % or less. Mn is more preferably 0.20 mass % less.

Components other than the above C, Si, and Mn, can be separated into a case in which no inhibitor is used and a case in which an inhibitor is used to cause secondary recrystallization.

First, when inhibitors are used to cause secondary recrystallization, for example, in a case where AlN-based inhibitors are used, the inhibitors contain Al and N in the following amounts. Al is preferably 0.010 mass % or more. Al is preferably 0.040 mass % or less. N is preferably 0.003 mass % or more. N is preferably 0.012 mass % or less. In a case where MnS/MnSe-based inhibitors are used, the inhibitors contain the aforementioned amounts of Mn and one or both of S and Se in the following amounts. S is preferably 0.002 mass % or more. S is preferably 0.030 mass % or less. Se is preferably 0.003 mass % or more. Se is preferably 0.030 mass % or less. In a case where any of the added amounts is less than the respective lower limit, the inhibitor effect cannot be sufficiently obtained. On the other hand, in a case where any of the added amounts exceeds the respective upper limit, the inhibitor component remains undissolved during slab heating, resulting in a decrease in magnetic properties. AlN-based and MnS/MnSe-based inhibitors may be used together.

In a case where no inhibitors are used, the components are preferably controlled to be in the following ranges. Al is 0.010 mass % or less, N is 0.005 mass % or less, S is 0.005 mass % or less, and Se is 0.005 mass % or less.

In addition to the above components, one or more selected from Ni: 0.010 mass % to 1.500 mass %, Cr: 0.01 mass % to 0.50 mass %, Cu: 0.01 mass % to 0.50 mass %, P: 0.005 mass % to 0.200 mass %, Sb: 0.005 mass % to 0.200 mass %, Sn: 0.005 mass % to 0.500 mass %, Bi: 0.005 mass % to 0.050 mass %, Mo: 0.005 mass % to 0.100 mass %, B: 0.0002 mass % to 0.0025 mass %, Te: 0.0005 mass % to 0.0100 mass %, Nb: 0.001 mass % to 0.030 mass %, V: 0.001 mass % to 0.010 mass %, W: 0.002 mass % to 0.050 mass %, Ti: 0.001 mass % to 0.050 mass %, and Ta: 0.001 mass % to 0.050 mass % may be added as appropriate to improve magnetic properties.

Of these components, Cu exceeding the upper limit thereof facilitates the generation of surface cracks, while P and Sn exceeding the upper limits thereof facilitates fracturing during rolling. In a case where Mo and Bi exceed the upper limits thereof, the inhibiting capability may become too strong and secondary recrystallization may become unstable. Nb and Ti exceeding the upper limits thereof may remain in the steel until the final product and degrade the iron loss properties. In addition, in a case where other elements exceed the upper limits thereof, the film may degrade. In these respects, the upper limits are preferably limited. On the other hand, each lower limit of each is specified from the viewpoint of obtaining an additive effect.

The following describes a method of producing a grain-oriented electrical steel sheet according to the present disclosure.

After steel comprising the aforementioned chemical compositions is prepared by smelting in a conventional refining process, steel material (slabs) may be produced by conventionally known ingot-blooming or continuous casting, or thin slabs of 100 mm or less in thickness may be produced by direct casting. The slabs are heated according to a conventional method, e.g., to about 1350 °C when containing inhibitor components, and when containing no inhibitor components, are heated to 1300 °C or less and then subjected to hot rolling. In a case where the slabs contain no inhibitor components, the slabs may be subjected to casting and then immediate hot rolling without heating. Also, the thin slabs may be either subjected to hot rolling or directly fed to the next process skipping hot rolling.

Next, the hot-rolled sheets or thin slabs obtained by the hot rolling are then subjected to hot-rolled sheet annealing as necessary. To obtain good magnetic properties, the temperature of this hot-rolled sheet annealing is preferably 800 °C or more. The temperature is preferably 1150 °C or less. In detail, at less than 800 °C, the band texture formed during hot rolling remains, making obtaining a primary recrystallized texture of uniformly-sized grains difficult and inhibiting the development of secondary recrystallization. On the other hand, in a case where the temperature exceeds 1150 °C, the grain size after the hot-rolled sheet annealing becomes too coarse, still making obtaining a primary recrystallized texture of uniformly-sized grains difficult.

After the hot rolling or hot-rolled sheet annealing, the hot-rolled sheets or thin slabs are subjected to cold rolling once, or cold rolling twice or more with intermediate annealing performed therebetween, to make a cold-rolled sheet with a final sheet thickness. The annealing temperature of the intermediate annealing is preferably 900 °C or more. The annealing temperature is preferably 1200 °C or less. At less than 900 °C, recrystallized grains after the intermediate annealing are finer and there are fewer nuclei with Goss orientation in the primary recrystallized texture, resulting in a decrease in the magnetic properties of the product sheet. On the other hand, in a case where the temperature exceeds 1200 °C, as in the hot-rolled sheet annealing, crystal grains become too coarse, making obtaining a primary recrystallized texture of uniformly-sized grains difficult.

In the cold rolling (final cold rolling) to obtain a final sheet thickness, increasing the steel sheet temperature during the cold rolling to 100 °C to 300° C. or subjecting the steel sheet to aging treatment one or more times at a temperature of 100 °C to 300 °C partway through the cold rolling is effective for improving the primary recrystallized texture and thereby the magnetic properties.

The cold-rolled sheet having a final sheet thickness is then subjected to decarburization annealing combined with primary recrystallization annealing. Based on the absorbance of fayalite ($Fe_2SiO_4$) and clinoferrosilite ($FeSiO_3$) in FTIR measurements of the steel sheet surface, the sum of the absorbance ratios (Formula 1 above) of the steel sheet after decarburization annealing being 45% or more is important.

To achieve this, the conditions for decarburization annealing are an annealing temperature of 700 °C to 900 °C and a soaking time of 30 seconds to 300 seconds. In a case where the annealing temperature of the decarburization annealing is less than 700 °C or the soaking time is less than 30 seconds, either the decarburization is insufficient or the primary recrystallized grain size becomes small, causing the magnetic properties to degrade. On the other hand, in a case where the temperature exceeds 900 °C or the soaking time exceeds 300 seconds, the primary grain size becomes too large and still the magnetic properties degrade.

Furthermore, decarburization annealing comprises a heating process of heating the cold-rolled sheet to the above annealing temperature range and a soaking process of heating the cold-rolled sheet and then holding it in the temperature range for the aforementioned soaking time. The soaking process can be divided into an earlier stage of controlling a thickness of the subscale and a latter stage of adjusting a reactivity of the subscale and the annealing separator, and at least the earlier stage is performed in a humid hydrogen atmosphere and the atmosphere dew point is 45 °C to 60 °C In other words, the atmosphere dew point in at least the earlier stage of the soaking process should be 45 °C to 60 °C. In a case where the dew point is lower than 45 °C, a sufficient amount of subscale cannot be obtained, which in turn results in insufficient formation of the base film. In a case where the atmosphere dew point is higher than 60 °C, the amount of the base film formed may be excessive and the adhesion of the base film may degrade.

The $H_2$ concentration of the above-described humid hydrogen atmosphere, in which the earlier stage is performed, can be 40% to 80% as in conventional methods. The above-described absorbances, A1, A2 and A3, can then be adjusted by changing the dew point and $H_2$ concentration in the above ranges and adjusting the atmospheric oxidizability, $pH_2O/pH_2$. Such $pH_2O/pH_2$ is desirably in the range of 0.3 to 0.55.

In stages other than the earlier stage of the soaking process of the decarburization annealing, it is desirable that a humid hydrogen atmosphere is used and the atmosphere dew point be in the range of 45 °C to 60 °C Alternatively, the atmosphere can be changed at each stage of the heating process or soaking process. In addition, a dry hydrogen atmosphere can be used in the latter stage of the soaking process.

As mentioned above, the soaking process can be divided into two stages: the earlier stage and the latter stage. Using different conditions, either one or both of the soaking temperature or the oxidizability $pH_2O/pH_2$ of the annealing atmosphere, for the earlier stage and latter stage is preferable. This is because the subscale can be more precisely controlled.

That is, when changing the soaking temperature, the temperature difference between the earlier stage and the latter stage is preferably 20 °C or more. On the other hand, when changing the oxidizability, the difference of $pH_2O/pH_2$ should be changed by 0.2 or more. In either case, the amount of change is not limited, but in general, the latter stage is often hotter than the earlier stage with respect to temperature, and the latter stage often has a lower $pH_2O/pH_2$ than the earlier stage with respect to oxidizability. The present disclosure enables these conditions to be followed.

Furthermore, the earlier stage can be further divided into multiple stages, in which case the difference in temperature and/or $pH_2O/pH_2$ between the latter stage and the preceding stage should follow the aforementioned conditions.

However, the above-described absorbance ratios A1, A2, and A3 may change depending on the material composition and the process prior to decarburization annealing. Therefore, further adjusting the annealing conditions within each of the aforementioned decarburization annealing conditions in accordance with the production history is necessary.

For example, in a case where the Si content contained in the steel material is 3 mass % or less, the absorbance ratio tends to decrease. Therefore, the dew point is set higher. In a case where the cleanliness of the steel sheet surface before decarburization annealing (e.g., the amount of oxygen on the surface before decarburization annealing) is as high as 0.1 $g/m^2$ or more, setting a lower dew point would also be effective. In order to increase the absorbance ratio, the dew point of the heating process of decarburization annealing can be set higher and the dew point of the soaking process can be set lower.

These treatments are not limited, and any condition within the range of each aforementioned decarburization annealing condition may be used as long as the absorbance ratio can be kept within the desired range according to the present disclosure.

Next, after the decarburization annealing, an annealing separator is applied, and the final annealing is performed. Such final annealing takes place in an atmosphere containing $H_2$ with the temperature range from at least 950 ° C. to 1100 °C, and the gas flow rate in the temperature range is set to $1.0\times10^{-5}$ NL/min to $7.6\times10^{-5}$ NL/min per steel sheet surface area, which is an important aspect according to the present disclosure as mentioned above. This temperature range is a temperature range where the MgO of the annealing separator enriches the Fe and Mn in the film through a substitution reaction with $(Fe,Mn)_2SiO_4$ on the steel sheet surface.

Usually, the gas flow rate in the final annealing is determined in accordance with the volume of the furnace, but in the present disclosure, setting the gas flow rate range in accordance with the surface area of the steel sheet is important as mentioned above. This is because the gas flow rate would be too high for the volume of the furnace. In detail, in a case where the gas flow rate is less than $1.0\times10^{-5}$ NL/min, the effect of gas injection itself decreases, resulting in poor film formation. On the other hand, in a case where the gas flow rate exceeds $7.6\times10^{-5}$ NL/min, Fe and Mn migrate into MgO. Therefore, the separation resistance of the film in magnetic domain refining degrades.

The $H_2$ concentration of the atmosphere in the above-described temperature range may be low, but as a guide, the $H_2$ concentration is 0.1 vol % or more. The $H_2$ concentration is even more preferably 0.5 vol % or more. The upper limit may be 100 vol %. $N_2$, Ar, etc. can be mainly used as the gas to balance the atmosphere in a case where the concentration is less than 100 vol %.

After the final annealing, the steel sheet coil is subjected to water washing, brushing, pickling, etc. to remove an unreacted annealing separator adhering to the steel sheet surface, and then coated with a coating solution, dried, baked, and subjected to flattening annealing to make steel sheets for magnetic domain refining treatment.

In each resulting steel sheet, the base film has a Young's modulus of 108 GPa to 144 GPa and a Mn+Fe concentration of 0.05 mass % to 5.0 mass %.

In a case where the Young's modulus of the base film is less than 108 GPa, the film adhesion itself degrades. On the other hand, in a case where the Young's modulus of the base film exceeds 144 GPa, film fracturing occurs due to magnetic domain refining.

In a case where the Mn+Fe concentration in the base film is less than 0.05 mass %, these elements are unable to absorb the thermal stress generated by magnetic domain refining, and film fracturing occurs. On the other hand, the upper limit of the Mn+Fe concentration is not particularly limited, but about 5.0 mass % is preferred considering productivity, etc.

The Mn+Fe concentration in the base film may be analyzed by EPMA, Auger electron spectroscopy, SIMS, or any other analytical method usually used to analyze the Mn and Fe concentrations in steel sheets.

The magnetic domain refining treatment method can be used to introduce linear or point-like thermal strain or impact strain to the final product sheet by laser irradiation, electron beam irradiation, plasma jet, etc., as is commonly practiced.

The grain-oriented electrical steel sheet produced in this way not only has excellent corrosion resistance and insulation properties due to its high film adhesion, but also has the effect of improving iron loss properties by increasing the irradiation energy to the ideal intensity, since no film separation occurs even when the irradiation energy for magnetic domain refining is sufficiently high.

Furthermore, in the production method according to the present disclosure, conventional methods may be used for any methods not described herein.

The chemical composition of the grain-oriented electrical steel sheet according to the present disclosure is the chemical composition of a steel sheet obtainable by applying the aforementioned production method to steel having the aforementioned chemical composition.

Specifically, the chemical composition contains C: 0.005 mass % or less, Si: 2.5 mass % to 4.5 mass %, Mn: 0.03 mass % to 0.30 mass %, Al: 0.010 mass % or less, N: 0.005 mass % or less, S: 0.005 mass % or less, and Se: 0.005 mass % or less, with the balance being Fe and inevitable impurities.

In addition, the chemical composition may further contain one or more selected from Ni: 0.010 mass % to 1.500 mass %, Cr: 0.01 mass % to 0.50 mass %, Cu: 0.01 mass % to 0.50 mass %, P: 0.005 mass % to 0.200 mass %, Sb: 0.005 mass % to 0.200 mass %, Sn: 0.005 mass % to 0.500 mass %, Bi: 0.005 mass % to 0.050 mass %, Mo: 0.005 mass % to 0.100 mass %, B: 0.0002 mass % to 0.0025 mass %, Te: 0.0005 mass % to 0.0100 mass %, Nb: 0.001 mass % to 0.030 mass %, V: 0.001 mass % to 0.010 mass %, W: 0.002 mass % to 0.050 mass %, Ti: 0.001 mass % to 0.050 mass %, and Ta: 0.001 mass % to 0.050 mass %.

EXAMPLES

Example 1

Steel slabs containing C: 0.070 mass %, Si: 3.43 mass %, Mn: 0.08 mass %, Al: 0.005 mass %, N: 0.004 mass %, S: 0.002 mass %, and Sb: 0.02 mass %, with the balance being Fe and inevitable impurities were produced by continuous casting, heated to 1250 °C, then subjected to hot rolling and made into hot-rolled sheets with a sheet thickness of 2.4 mm. Each hot-rolled sheet was subjected to hot-rolled sheet annealing under a set of conditions including 1000 °C for 50 seconds, primary cold rolling to an intermediate sheet thickness of 1.8 mm, intermediate annealing under a set of conditions including 1100 °C for 20 seconds, secondary cold rolling, and made into a cold-rolled sheet with a final sheet thickness of 0.27 mm. Each cold-rolled sheet was then subjected to decarburization annealing. The decarburization annealing was performed by holding the cold-rolled sheet at 840 °C for 100 seconds in a humid atmosphere of 50 vol % $H_2$-50 vol % $N_2$ with a dew point of 57 °C. The sum of the absorbance ratios of fayalite and clinoferrosilite was adjusted to 60%. Then, an annealing separator composed mainly of magnesium oxide was applied to the steel sheet surface and dried.

As final annealing, each steel sheet was subjected to heating in an $N_2$ atmosphere up to 950 °C, then in an atmosphere with various mixing conditions of $H_2$+Ar from 950 °C to 1100 °C, and then in an $H_2$ atmosphere from 1100 °C to 1170 °C at a rate of 25 °C/h, followed by annealing combined with purification, in which the steel sheet was maintained in the $H_2$ atmosphere for 10 hours at 1170 °C. During the heating process of this final annealing, the $H_2$ gas flow rate of the atmosphere was set to $3.0 \times 10^5$ NL/min at the steel sheet surface.

For each resulting final annealed sheet with a forsterite base film, the Young's modulus of the base film was evaluated by nanoindentation, and the Mn+Fe concentration in the base film was quantified by Auger electron spectroscopy.

Each final annealed sheet coil was then coated with a coating solution, dried, and subjected to flattening treatment under a set of conditions including 800 °C for 20 seconds to form a product sheet. Each product sheet was then irradiated with an electron beam at an irradiation power of 90 mA/mm$^2$, and the film was observed under a microscope to investigate the presence or absence of base film separation. The results of these investigations are listed in Table 2.

TABLE 2

| 950° C. to 1100° C. Atmospheric $H_2$ concentration (%) | Young's modulus (GPa) | Mn + Fe concentration (mass %) | Film separation | Remarks |
|---|---|---|---|---|
| 0 | 154 | 0.03 | Present | Comparative example |
| 0.5 | 140 | 0.06 | Absent | Example |
| 5 | 138 | 0.08 | Absent | Example |
| 20 | 136 | 0.09 | Absent | Example |
| 100 | 135 | 0.09 | Absent | Example |
| 10→0 (*1) | 148 | 0.04 | Present | Comparative example |
| 0→10 (*2) | 146 | 0.04 | Present | Comparative example |

(*1) 1000° C. or less, $H_2$: 10%; more than 1000° C., $H_2$: 0%.
(*2) 1050° C. or less, $H_2$: 0%; more than 1050° C., $H_2$: 10%

From Table 2, it can be seen that the application of the present disclosure prevents base film separation during electron beam irradiation.

Example 2

Steel slabs having the chemical compositions listed in Table 3, with the balance being Fe and inevitable impurities were produced by continuous casting, heated to 1380 °C, then subjected to hot rolling and made into hot-rolled sheets with a sheet thickness of 2.0 mm. Each hot-rolled sheet was subjected to hot-rolled sheet annealing under a set of conditions including 1030 °C for 10 seconds, cold rolling, and made into a cold-rolled sheet with a final sheet thickness of 0.23 mm. Each cold-rolled sheet was then subjected to decarburization annealing to obtain a steel sheet. In the earlier stage of decarburization annealing, the dew point is adjusted for each steel sample under a set of conditions including 840 °C×100 seconds and an atmosphere of 50 vol % $H_2$-50 vol % $N_2$, and in the latter stage of decarburization annealing, the conditions are 870 °C×10 seconds, 100 vol % $H_2$, and the dew point is fixed at 10 °C. The sum of the absorbance ratios of fayalite and clinoferrosilite was adjusted to 45% or more. Then, an annealing separator composed mainly of magnesium oxide was applied to the steel sheet surface and dried.

As final annealing, each steel sheet was subjected to heating in an Ar atmosphere up to 950 °C, then in an atmosphere containing $H_2$ with various $H_2$ concentrations from 950 °C to 1100 °C, and then in an $H_2$ atmosphere from 1100 °C to 1170 °C at a rate of 25 °C/h, followed by annealing combined with purification, in which the steel sheet was maintained in the $H_2$ atmosphere for 10 hours at 1170 °C. During the heating step of this final annealing, the $H_2$ gas flow rate of the atmosphere was set to $3.0 \times 10^{-5}$ NL/min at the steel sheet surface.

For each resulting final annealed sheet with a forsterite base film, the Young's modulus of the base film was evaluated by nanoindentation, and the Mn+Fe concentration in the base film was quantified by Auger electron spectroscopy.

Each final annealed sheet coil was then coated with a coating solution, dried, and subjected to flattening treatment under a set of conditions including 800 °C for 20 seconds to form a product sheet. Each product sheet was then irradiated with an electron beam at an irradiation power of 90 mA/mm$^2$, and the film was observed under a microscope to investigate the presence or absence of base film separation. The results of these investigations are listed in Table 3.

TABLE 3

| | Composition (mass %) | | | | | | | | Sum of absorbance ratios | Young's modulus | Fe + Mn | Film Separation after magnetic | |
|---|---|---|---|---|---|---|---|---|---|---|---|---|---|
| No. | C | Si | Mn | Al | N | Se | S | Others | (%) | (GPa) | (mass %) | domain refining | Remarks |
| 1 | 0.035 | 3.25 | 0.23 | 0.007 | 0.003 | — | — | — | 85 | 144 | 0.12 | Absent | Example |
| 2 | 0.044 | 3.06 | 0.03 | 0.007 | 0.003 | — | — | — | 47 | 120 | 0.06 | Absent | Example |
| 3 | 0.078 | 4.31 | 0.09 | 0.004 | 0.004 | — | — | — | 66 | 124 | 0.09 | Absent | Example |
| 4 | 0.065 | 3.50 | 0.08 | 0.035 | 0.008 | — | — | — | 57 | 122 | 0.07 | Absent | Example |
| 5 | 0.073 | 3.42 | 0.08 | 0.022 | 0.010 | 0.023 | — | — | 53 | 119 | 0.06 | Absent | Example |
| 6 | 0.058 | 3.25 | 0.06 | 0.023 | 0.008 | — | 0.025 | Nb: 0.009 | 55 | 113 | 0.08 | Absent | Example |
| 7 | 0.068 | 3.42 | 0.09 | 0.020 | 0.008 | 0.022 | — | B: 0.0023 | 64 | 122 | 0.09 | Absent | Example |
| 8 | 0.073 | 3.29 | 0.08 | 0.024 | 0.009 | 0.013 | — | Sb: 0.005, Te: 0.0095 | 53 | 120 | 0.07 | Absent | Example |
| 9 | 0.075 | 3.37 | 0.08 | 0.025 | 0.008 | 0.020 | — | Sb: 0.007, Cu: 0.01, P: 0.005 | 54 | 118 | 0.07 | Absent | Example |
| 10 | 0.071 | 3.31 | 0.07 | 0.021 | 0.007 | 0.025 | — | Ni: 0.015, Cr: 0.01, Sb: 0.180 | 56 | 115 | 0.06 | Absent | Example |

TABLE 3-continued

| No. | Composition (mass %) C | Si | Mn | Al | N | Se | S | Others | Sum of absorbance ratios (%) | Young's modulus (GPa) | Fe + Mn (mass %) | Film Separation after magnetic domain refining | Remarks |
|---|---|---|---|---|---|---|---|---|---|---|---|---|---|
| 11 | 0.073 | 3.50 | 0.07 | 0.025 | 0.008 | 0.013 | — | B: 0.0018, Nb: 0.001 | 50 | 115 | 0.07 | Absent | Example |
| 12 | 0.067 | 3.23 | 0.10 | 0.025 | 0.004 | 0.023 | — | Sn: 0.006, V: 0.008 | 72 | 133 | 0.10 | Absent | Example |
| 13 | 0.067 | 3.25 | 0.08 | 0.040 | 0.011 | — | — | Ti: 0.008, Ta: 0.009 | 60 | 117 | 0.08 | Absent | Example |
| 14 | 0.035 | 3.31 | 0.03 | 0.013 | 0.008 | — | — | Bi: 0.005, Sn: 0.450 | 45 | 115 | 0.06 | Absent | Example |
| 15 | 0.073 | 3.18 | 0.08 | 0.027 | 0.007 | 0.023 | — | Bi: 0.090, Mo: 0.006, Ti: 0.002 | 51 | 113 | 0.06 | Absent | Example |
| 16 | 0.069 | 3.31 | 0.08 | 0.023 | 0.008 | 0.020 | 0.003 | Te: 0.0007, Nb: 0.008 | 59 | 114 | 0.07 | Absent | Example |
| 17 | 0.071 | 3.23 | 0.07 | 0.018 | 0.006 | 0.021 | — | V: 0.002, Ta: 0.002 | 53 | 115 | 0.06 | Absent | Example |
| 18 | 0.073 | 3.32 | 0.07 | 0.024 | 0.008 | 0.021 | — | P: 0.180, Mo: 0.070 | 58 | 122 | 0.07 | Absent | Example |
| 19 | 0.067 | 3.44 | 0.07 | 0.021 | 0.007 | 0.018 | — | Cu: 0.40, Cr: 0.38 | 53 | 124 | 0.06 | Absent | Example |
| 20 | 0.069 | 2.85 | 0.08 | 0.024 | 0.009 | 0.021 | — | B: 0.0004, Ni: 1.370 | 52 | 122 | 0.06 | Absent | Example |
| 21 | 0.071 | 3.23 | 0.07 | 0.018 | 0.006 | 0.021 | — | V: 0.002, Ta: 0.002 | 56 | 125 | 0.07 | Absent | Example |
| 22 | 0.073 | 3.32 | 0.07 | 0.024 | 0.008 | 0.021 | — | P: 0.180, Mo: 0.070 | 57 | 126 | 0.08 | Absent | Example |
| 23 | 0.067 | 3.44 | 0.07 | 0.021 | 0.007 | 0.018 | — | Cu: 0.40, Cr: 0.38 | 56 | 122 | 0.08 | Absent | Example |
| 24 | 0.069 | 2.89 | 0.08 | 0.024 | 0.009 | 0.021 | — | B: 0.0004, Ni: 1.370 | 52 | 118 | 0.07 | Absent | Example |

From Table 3, it can be seen that the application of the present disclosure prevents film separation during electron beam irradiation.

The invention claimed is:

1. A grain-oriented electrical steel sheet containing Mn, the steel sheet having a ceramic film, wherein the ceramic film has a Mn +Fe concentration of 0.05 mass % or more and a Young's modulus of 108 GPa to 144 GPa.

2. A method of producing the grain-oriented electrical steel sheet according to claim 1, comprising:

subjecting a Mn-containing steel material for grain-oriented electrical steel sheets to hot rolling to obtain a steel sheet; then subjecting the steel sheet to cold rolling once or twice or more with intermediate annealing performed therebetween to a final sheet thickness; then subjecting the steel sheet to decarburization annealing combined with primary recrystallization; then applying an annealing separator containing 50 mass % or more of MgO to a surface of the steel sheet; then subjecting the steel sheet to final annealing; and optionally removing an unreacted separator after the final annealing; and then subjecting the steel sheet to flattening annealing, wherein as conditions of the decarburization annealing an annealing temperature is controlled within a range of 700 °C to 900 °C, a soaking time is controlled within a range of 30 seconds to 300 seconds, and, at least in an earlier stage of the soaking process, a humid hydrogen atmosphere dew point is controlled within a range of 45 °C to 60 °C, such that $\{(A1+A2)/(A1+A2+A3)\}\times 100$ is 45% or more, where A1, A2, and A3 represent absorbance of fayalite, absorbance of clinoferrosilite, and absorbance of silica, respectively, as measured using Fourier transform infrared absorption spectroscopy (FTIR) on the surface of the steel sheet after the decarburization annealing, and wherein the final annealing is performed in an atmosphere containing $H_2$, at least in a temperature range of 950 °C to 1100 °C, and a gas flow rate in the temperature range is set in a range of $1.0\times10^{-5}$ (NL/min) to $7.6\times10^{-5}$ (NL/min) per 1 $m^2$ of a surface area of the steel sheet.

* * * * *